US012674586B2

(12) United States Patent
Li et al.

(10) Patent No.: US 12,674,586 B2
(45) Date of Patent: Jul. 7, 2026

(54) SYSTEM FOR ADJUSTING AND CONTROLLING TEMPERATURE OF INTELLIGENT NEW ENERGY FARMHOUSE INTEGRATED WITH TUNNEL WIND AND SOLAR ENERGY

(71) Applicants:QINGDAO UNIVERSITY OF TECHNOLOGY, Shandong (CN); BEIJING ANXING HI-TECH NEW ENERGY DEVELOPMENT CO., LTD., Beijing (CN)

(72) Inventors: Changhe Li, Shandong (CN); Jingang Sun, Shandong (CN); Jinan Ma, Beijing (CN); Xiaoyun Cai, Beijing (CN); Jianan Wen, Shandong (CN); Xi Meng, Shandong (CN); Xiao Ma, Shandong (CN)

(73) Assignees: QINGDAO UNIVERSITY OF TECHNOLOGY, Shandong (CN); BEIJING ANXING HI-TECH NEW ENERGY DEVELOPMENT CO., LTD., Beijing (CN)

( * ) Notice: Subject to any disclaimer, the term of this patent is extended or adjusted under 35 U.S.C. 154(b) by 473 days.

(21) Appl. No.: 18/277,083

(22) PCT Filed: Nov. 21, 2022

(86) PCT No.: PCT/CN2022/133291
§ 371 (c)(1),
(2) Date: Aug. 14, 2023

(87) PCT Pub. No.: WO2024/055415
PCT Pub. Date: Mar. 21, 2024

(65) Prior Publication Data
US 2025/0003603 A1     Jan. 2, 2025

(30) Foreign Application Priority Data

Sep. 15, 2022     (CN) ........................... 202211130116.8

(51) Int. Cl.
*F24F 5/00* (2006.01)
*E04B 1/76* (2006.01)
(Continued)

(52) U.S. Cl.
CPC ............ *F24D 5/005* (2013.01); *E04B 1/7608* (2013.01); *F24D 5/02* (2013.01); *F24F 5/0046* (2013.01);
(Continued)

(58) Field of Classification Search
CPC .. Y02B 30/00; F24D 2200/11; F24D 2200/14
See application file for complete search history.

(56) References Cited

U.S. PATENT DOCUMENTS 7,698,903 B1* 4/2010 Van Hoesen ........... F24T 10/10
                                                                    165/45
2009/0199846 A1* 8/2009 Collins ................... F24S 25/00
                                                                    126/623
(Continued)

FOREIGN PATENT DOCUMENTS

CN     201311016 Y * 9/2009
CN     102589078     7/2012
(Continued)

OTHER PUBLICATIONS

Mengfei Nan, "Regeneration and Development Research of Xinjiang Uygur traditional "Arab-wang" Houses", China Knowledge Network-Master Electronic Journals, Feb. 15, 2016, with English abstract, pp. 1-11.

(Continued)

*Primary Examiner* — Jorge A Pereiro
(74) *Attorney, Agent, or Firm* — JCIPRNET

(57) ABSTRACT

A system for adjusting and controlling temperature of an intelligent new energy farmhouse integrated with tunnel wind and solar energy. The system includes a house, a solar chimney system, a solar power supply system and a tunnel wind system. The house includes walls and a sunroom is mounted on outside of one of the walls; the house is provided with detection module being connected to master control module; the solar chimney system includes first Venturi tube provided on top of the house and connected to solar chimney which extends longitudinally along inside of the one of the walls; the solar power supply system is provided on top of the house; and the tunnel wind system comprises a water cellar with duct assembly provided inside the water cellar, one end of the duct assembly is connected to forced draft system and the other end is connected to interior of the house.

15 Claims, 12 Drawing Sheets

(51) Int. Cl.

| | |
|---|---|
| *F24D 5/00* | (2022.01) |
| *F24D 5/02* | (2006.01) |
| *F24F 8/108* | (2021.01) |
| *F24F 8/22* | (2021.01) |
| *F24F 11/63* | (2018.01) |
| *H02S 10/12* | (2014.01) |
| *H02S 20/23* | (2014.01) |
| *F24F 110/10* | (2018.01) |
| *F24F 110/12* | (2018.01) |
| *F24F 110/20* | (2018.01) |
| *F24F 110/22* | (2018.01) |
| *F24F 110/52* | (2018.01) |

(52) U.S. Cl.
CPC ................ *F24F 8/108* (2021.01); *F24F 8/22* (2021.01); *F24F 11/63* (2018.01); *H02S 10/12* (2014.12); *H02S 20/23* (2014.12); *F24F 2110/10* (2018.01); *F24F 2110/12* (2018.01); *F24F 2110/20* (2018.01); *F24F 2110/22* (2018.01); *F24F 2110/52* (2018.01)

(56) References Cited

U.S. PATENT DOCUMENTS

| | | | | |
|---|---|---|---|---|
| 2009/0277603 | A1* | 11/2009 | Yang | F24V 50/00 |
| | | | | 165/45 |
| 2010/0300645 | A1* | 12/2010 | Glover | F24F 11/30 |
| | | | | 454/238 |
| 2013/0276864 | A1* | 10/2013 | Neber | H02S 20/00 |
| | | | | 136/246 |

FOREIGN PATENT DOCUMENTS

| | | | | | |
|---|---|---|---|---|---|
| CN | 105716175 | | 6/2016 | | |
| CN | 205403040 | U * | 7/2016 | | |
| CN | 106989463 | | 7/2017 | | |
| CN | 107062474 | | 8/2017 | | |
| CN | 107893548 | A * | 4/2018 | ............... | E04H 1/02 |
| CN | 110671770 | | 1/2020 | | |
| CN | 211791398 | U * | 10/2020 | | |
| CN | 114060999 | A * | 2/2022 | ............... | F24F 7/003 |
| CN | 114353210 | | 4/2022 | | |
| JP | H0617546 | A * | 1/1994 | | |
| JP | 2002235955 | | 8/2002 | | |

OTHER PUBLICATIONS

"International Search Report (Form PCT/ISA/210) of PCT/CN2022/133291", mailed on Apr. 23, 2023, with English translation thereof, pp. 1-6.
"Written Opinion of the International Searching Authority (Form PCT/ISA/237) of PCT/CN2022/133291", mailed on Apr. 23, 2023, with English translation thereof, pp. 1-7.

* cited by examiner

I-3   I-2   I-1
I-4
I-5
I-6
I-17
I-16
I-15
I-7
I-8
I-9
I-10
III-11
I-11
III-12
I-14
III-6
I-13
I-12
III-10

II-2-1

II-2-2

II-2-3

II-2-4

III-3　III-2　III-1

III-4
III-14
III-13
III-5
III-6

III-7

III-8

III-9
III-10
III-11
III-12

I-5

I-8

I-9

I-10

VI-5

III-8

I-6

I-6-24

IV-1

IV-2

A
50:1

III-16

III-15

IV-1

I-14

VI-5

VI-4

VI-3

I-15

VI-2

I-16

I-17

VI-1

VII-8

VII-7

VII-1

VII-2

VII-6

VII-5

VII-3

VII-4

VII-9

VII-10

VII-1-3

VII-2

VII-8

VII-7

VII-3

VII-6

VII-5

VII-1-1

VII-1-4

VII-1-2

VII-1-3

VII-1-1-1

VII-1-1-2

VII-1-1-3

VII-1-1-4

VII-1-1-7

VII-1-1-6

VII-1-1-5

SYSTEM FOR ADJUSTING AND CONTROLLING TEMPERATURE OF INTELLIGENT NEW ENERGY FARMHOUSE INTEGRATED WITH TUNNEL WIND AND SOLAR ENERGY

CROSS-REFERENCES TO RELATED APPLICATIONS

This application is a 371 of international application of PCT application serial no. PCT/CN2022/133291, filed on Nov. 21, 2022, which claims the priority benefit of China application no. 202211130116.8, filed on Sep. 15, 2022. The entirety of each of the above-mentioned patent applications is hereby incorporated by reference herein and made a part of this specification.

TECHNICAL FIELD

The present invention relates to the field of new energy architecture, especially to a system for adjusting and controlling temperature of an intelligent new energy farmhouse integrated with tunnel wind and solar energy.

BACKGROUND

The compound technology of tunnel wind combined with solar chimney cannot only strengthen and guide natural ventilation, but also improve indoor thermal environment by heating and cooling farmhouses, so as to realize the effect of warm in winter and cool in summer. At present, there are some solutions to combine solar energy with tunnel wind for farmhouses, such as:

The Chinese patent application No. 201610076161.8 discloses a composite system of solar heat supply and tunnel wind, which can realize indoor heating and cooling by using the switch on/off of an wind valve, but when the indoor temperature changes along with the cooling and heating time, the wind valve cannot change the state of switching on or off according to the change of the specific temperature in time, so that the indoor temperature cannot be maintained within the range of human comfort at all times. In the summer, the system uses a solar chimney which can cool the room; however, when there is no sunlight, the suction force of the solar chimney will be reduced and it will not fully play its role. Furthermore, in the hot summer and cold winter, the cooling and heating ways are relatively single by using only the heat source and cold source generated by the solar energy and the tunnel wind, and the cooling and heating effects are difficult to meet the needs of users.

The Chinese patent application No. 201710350567.5 discloses a composite system of energy storage and ventilation by tunnel wind and solar chimney, and in the daytime, solar radiation enter that chimney passage through the transparent glass cover plate and is collect by the heat collecting plate to heat the air in the passage, and part of solar energy is absorbed by the heat storage material; at night, the heat storage material releases heat to heat the air in the passage, so as to improve indoor environmental condition. However, in summer, solar radiation enters the chimney passage through the transparent glass cover plate, resulting in higher indoor temperature than the wall without transparent glass, and the cooling way in summer is single. Although the system has added heat storage materials, so that the system can continue to operate at night, and is conducive to winter heating, but do not effectively take materials for summer cooling.

To sum up, at present, in the research and application of new energy sources such as tunnel wind and solar chimney in farmhouse energy-saving system, there are the following problems:

(1) Although the tunnel wind and solar chimney can ventilate and supply heat to the room through the wind valve, the switching on/off of the wind valve cannot make corresponding changes in time according to the change of indoor and outdoor temperature, and cannot achieve intelligent control.

(2) When there is no sunlight, the suction force of the solar chimney will be reduced; a solar chimney system can provide heating to the room in winter, but the heating provided is limited, and when there is no sunlight, the solar chimney cannot play the role of heating the room.

(3) Only the temperature is considered but the influence of humidity on indoor comfort is ignored, and the applied heating and cooling paths are relatively single, which makes it difficult to meet the users' demand for indoor temperature and humidity during hot weather in summer and cold weather in winter.

(4) The use of tunnel wind system to send hot air through the buried pipe into the ground for heat exchange with underground soil and then send cold air into the room after the heat exchange, can achieve the of indoor cooling, but long-term use of tunnel wind system will lead to the decline of soil heat transfer capacity.

SUMMARY

In view of the shortcomings of the existing technology, it is an object of the present invention to provide a system for adjusting and controlling temperature of an intelligent new energy farmhouse integrated with tunnel wind and solar energy, which may achieve an intelligent energy adjustment of new energy on farmhouses through a reasonable application of various new energy sources such as tunnel wind, solar energy, and phase-change materials, improve the comfort of the indoor environment of the farmhouse, and reduce the energy consumption of the farmhouse.

In order to achieve the above purpose, the present invention is realized by the following technical solutions:

An embodiment of the present invention provides a system for adjusting and controlling temperature of an intelligent new energy farmhouse integrated with tunnel wind and solar energy, including:

a house, including walls and a roof, the roof is filled with phase-change energy storage material, and a sunroom is mounted on an outside of one of the walls; the house is provided with a detection module, and the detection module is connected to a master control module;

a solar chimney system, including a first Venturi tube provided on a top of the house, the first Venturi tube being connected to a solar chimney, the solar chimney extending longitudinally along an inside of the one of the walls;

a solar power supply system, with a plurality provided on a top of the house for supplying power to the house; and a tunnel wind system, including a water cellar with a duct assembly being provided inside the water cellar, a first end of the duct assembly is connected to a forced draft system and a second end of the duct assembly is connected to an interior of the house.

As a further implementation, the duct assembly comprises a forced draft duct, a heat exchange duct and an air outlet duct which are sequentially communicated, wherein the heat exchange duct is provided with a plurality and arranged in parallel; an air outlet of the air outlet duct is connected with a second Venturi tube and a third Venturi tube which is vertical to the second Venturi tube.

As a further implementation, the forced draft system includes a housing, a forced draft fan mounted on an outside of the housing, and a plurality of air purification devices mounted in the housing; the forced draft fan is connected to the duct assembly through a forced draft port at a bottom of the housing.

As a further implementation, the air purification device includes a first frame and a second frame arranged at intervals, and a primary filter, an activated carbon layer, a nano-ion layer, a high efficiency particulate air (HEPA) filter and a cold catalyst layer are provided between the first frame and the second frame in an order from top to bottom.

As a further implementation, an inner layer of the walls is at least one layer of a heat storage wall panel, and an outer layer of the walls is a transparent glass wall panel with a set length, and a heat collection wall panel is provided at a bottom of the transparent glass wall panel.

Or, the outer layer is a heat insulating wall panel.

As a further implementation, a passage for the solar chimney to pass through is formed between the outer layer and the inner layer of the one of the walls.

As a further implementation, the solar chimney includes a chimney inclined section located on the roof and a chimney vertical section extending into the house.

The chimney inclined section is connected to a first end of the first Venturi tube by a hub bearing, and induced wind plates are mounted oppositely on a second end of the first Venturi tube.

As a further implementation, the chimney vertical section is provided with wind valves corresponding to an inner side and an outer side of the house respectively; a plurality of intelligent valves are arranged in the chimney vertical section.

As a further implementation, the wind valve located at the outer side of the house is provided with ultraviolet (UV) disinfection light.

As a further implementation, the detection module includes an indoor temperature and humidity sensor, an outdoor temperature and humidity sensor, a position sensor and an air quality detection device, wherein the indoor temperature and humidity sensor is arranged in the house, and the outdoor temperature and humidity sensor, the position sensor and the air quality detection device are arranged outside the house.

As a further implementation, the solar power supply system includes a solar photovoltaic cell panel being mounted on the roof through an angle adjusting device.

As a further implementation, the solar photovoltaic cell panel is connected to an inverter through a solar storage battery.

The angle adjusting device is arranged with a plurality and at intervals along a back side of the solar photovoltaic cell panel.

As a further implementation, the sunroom includes a sunroom framework, and a plurality of sunroom walls are sequentially provided on the sunroom framework, and a height of the sunroom walls are sequentially decreased to form a foldable structure.

The sunroom walls are made of transparent glass.

The beneficial effects of the present invention are as follows:

(1) according to the present invention, by integrating the solar chimney system, the solar power supply system, the tunnel wind system, etc., and being provided with the detection module, an intelligent energy adjustment of the entire farmhouse may be realized; through the mutual cooperation of various systems, the problem of single cooling and heating way of traditional tunnel wind and solar chimney may be improved, and the comfort degree of the environment in the farmhouse may be improved.

(2) according to the present invention, by utilizing the adjustment and control of the intelligent valve and the intelligent wind valve, the solar chimney extracting the hot air from the upper wind valve in summer and sending the hot air into the room through the upper wind valve from the lower wind valve in winter may be realized, thereby the efficient utilization of the solar chimney in the farmhouse may be improved; by arranging the hub bearing at the low side of the Venturi tube, and by arranging the induced wind plates at the side of the air outlet, the Venturi tube may freely rotate along the same horizontal plane, and the air inlet of the Venturi tube may always face the wind direction by utilize the moment action generated by wind power, thereby being more beneficial to exerting the suction force of the Venturi tube on the solar chimney; in winter, the suction force of the solar chimney may be maintained in the absence of light by utilizing the heat collection wall and the heat storage wall at the side of the solar chimney section.

(3) according to the present invention, the detection module may not only achieve the detection and control of temperature, but also achieve the detection and control of humidity, carbon monoxide and smoke through indoor and outdoor temperature and humidity sensors, indoor carbon monoxide sensors, smoke sensors and outdoor air quality detection devices, and may detect the opening and closing degree of air outlet valves and windows through position sensors, thus improving the comfort degree of indoor environment of farmhouses.

(4) according to the present invention, by adopting parallel heat exchange ducts, the defect of heat exchange capacity reduction caused by long-term use of the tunnel wind system may be improved, and two or more water cellars may be used to alternately supply cooling according to needs, or when the water temperature in the water cellar exceeds the preset temperature, the water in the water cellar may be replaced to maintain the cooling; according to the temperature of underground water cellar and indoor temperature above ground, the automatic and intelligent control of the tunnel wind system is realized.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

wherein, I solar chimney system, II solar power supply system, III house, IV sunroom, V ground, VI spraying system, VII tunnel wind system, I-1 first Venturi tube, I-1-1 throat, I-1-2 contraction section, I-1-3 inlet section, I-1-4 air inlet, I-1-5 hub bearing, I-1-6 induced wind plate, I-1-7 air outlet, I-1-8 diffusion section, I-2 chimney inclined section, I-3 chimney vertical section, I-4 first intelligent valve, I-5 smoke sensor, I-6 first wind valve, I-7 second intelligent valve, I-8 carbon monoxide sensor, I-9 inverter, I-10 indoor temperature and humidity sensor, I-11 third intelligent valve, I-12 UV disinfection light, I-13 second wind valve, I-14 position sensor, I-15 air quality detection device, I-16 outdoor temperature and humidity sensor, I-17 alarm device, II-1 solar photovoltaic (PV) panel, II-2 angle adjustment device, II-2-1 adjustable bracket, II-2-2 base, II-2-3 spherical connection sub, II-2-4 pushing part;

III-1 outer layer of roof, III-2 phase-change energy storage material, III-3 inner layer of roof, III-4 room beam, III-5 wind valve passage, III-6 transparent glass wall panel, III-7 chimney passage, III-8 window, III-9 room door, III-10 heat collection wall panel, III-11 heat storage wall panel, III-12 heat insulation wall panel, III-13 anti-dislodging groove, III-14 concrete wall, IV-1 sunroom wall, IV-2 sunroom door, VI-1 water pumping tube, VI-2 water pump, VI-3 vertical section of water delivery pipe, VI-4 horizontal section of water delivery pipe, VI-5 spraying head;

VII-1 forced draft system, VII-1-1 first air purification device, VII-1-1-1 first side frame, VII-1-1-2 primary filter, VII-1-1-3 activated carbon layer, VII-1-1-4 nano-ion layer, VII-1-1-5 HEPA filter, VII-1-1-6 cold catalyst layer, VII-1-

1-7 second side frame, VII-1-2 forced draft fan, VII-1-3 forced draft port, VII-1-4 second air purification device, VII-2 forced draft duct, VII-3 heat exchange duct, VII-4 water cellar, VII-5 air outlet duct, VII-6 second Venturi tube, VII-7 third Venturi tube, VII-8 air outlet, VII-9 water sucker, VII-10 flexible water pumping tube.

DETAILED DESCRIPTION

Embodiment 1

Figure 1:
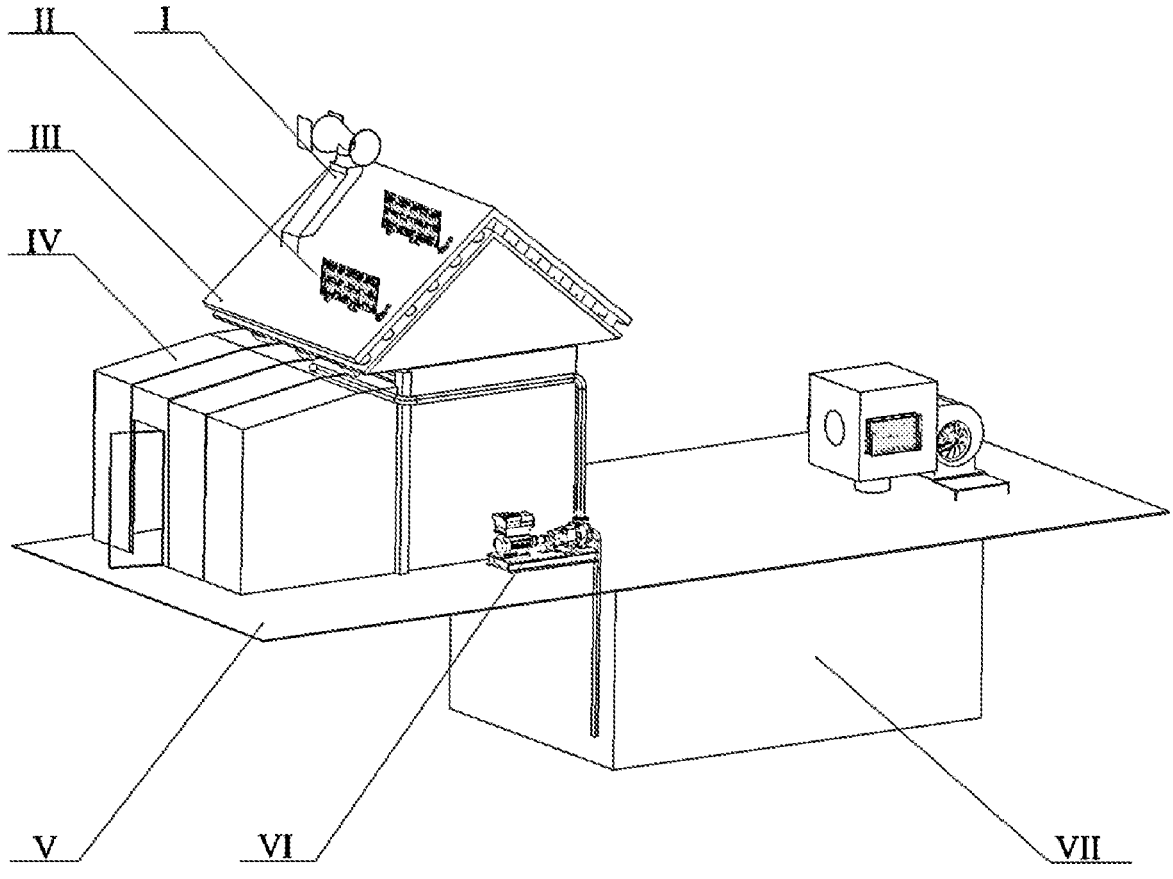
FIG. 1 is a schematic view of an overall structure of a new farmhouse system in embodiments of the present invention.

The present embodiment provides a system for adjusting and controlling temperature of an intelligent new energy farmhouse integrated with tunnel wind and solar energy, as shown in FIG. 1, including a solar chimney system I, a solar power supply system II, a house III, a sunroom IV, a tunnel wind system VII, wherein the solar chimney system I and the solar power supply system II are mounted in the house III, the sunroom IV is provided on one side of the house III, a spraying system VI is further provided on one side of the house III, the tunnel wind system VII is located below the ground V. The solar chimney system I and the sunroom IV form a heating system, and the solar chimney system I, the spraying system VI and the tunnel wind system VII form a cooling system. Through the compound of multiple new energy sources, the energy saving and intelligence of the farmhouse is realized to meet the requirements of sustainable architecture.

Figures 9, 10:
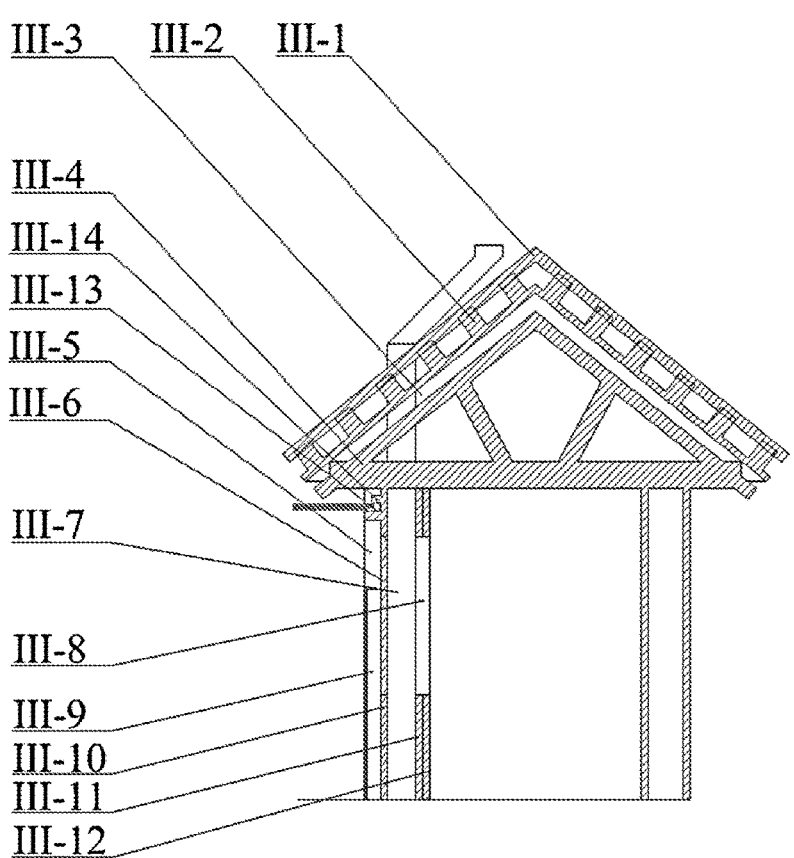
FIG. 9 is a structural sectional view of a house along a left-right direction in embodiments of the present invention.
FIG. 10 is a structural sectional view of an interior of the house along a front-rear direction in embodiments of the present invention.

Specifically, as shown in FIG. 9, the house III includes a roof, a roof beam III-4, and walls, and the roof is mounted on a top of the walls through the roof beam III-4. The roof is a double-layer structure, and includes an outer layer of the roof III-1 and an inner layer of the roof III-3, and a phase-change energy storage material III-2 is filled between the outer layer of the roof III-1 and the inner layer of the roof III-3 to form a double-layer phase-change roof; compared to concrete, using the phase-change material (PCM) is a more effective method of improving the ventilation management capacity of the solar chimney, and the PCM may store and release thermal energy during melting and freezing. When crystallized, the PCM releases a large amount of energy in the form of latent heat of melting; when melted, the PCM absorbs an equal amount of energy from the environment.

In the present embodiment, the two phase-change layers with different phase-change temperatures are mounted on the inner wall surface of the double-layer roof, and the low-temperature phase-change layer is closer to the side of indoor. Compared with the single-layer PCM, the double-layer PCM can better reduce the building energy consumption.

At least one wall is mounted with a window III-8, and the window III-8 is of a bridge-cutoff aluminum alloy window, which has better sealing, heat insulation and thermal insulation. Preferably, the window III-8 is provided on a sunny side of the house III, and the ventilation of the room is realized through the opening and closing of the window III-8. In the present embodiment, the window III-8 is able to open automatically, as long as the driving mechanism is connected, and this approach is prior art. A room door III-9 is mounted on one of the walls and is made of a special profile wood and aluminum alloy of bridge-cutoff aluminum and insulating glass and heat insulation material.

Figure 13:
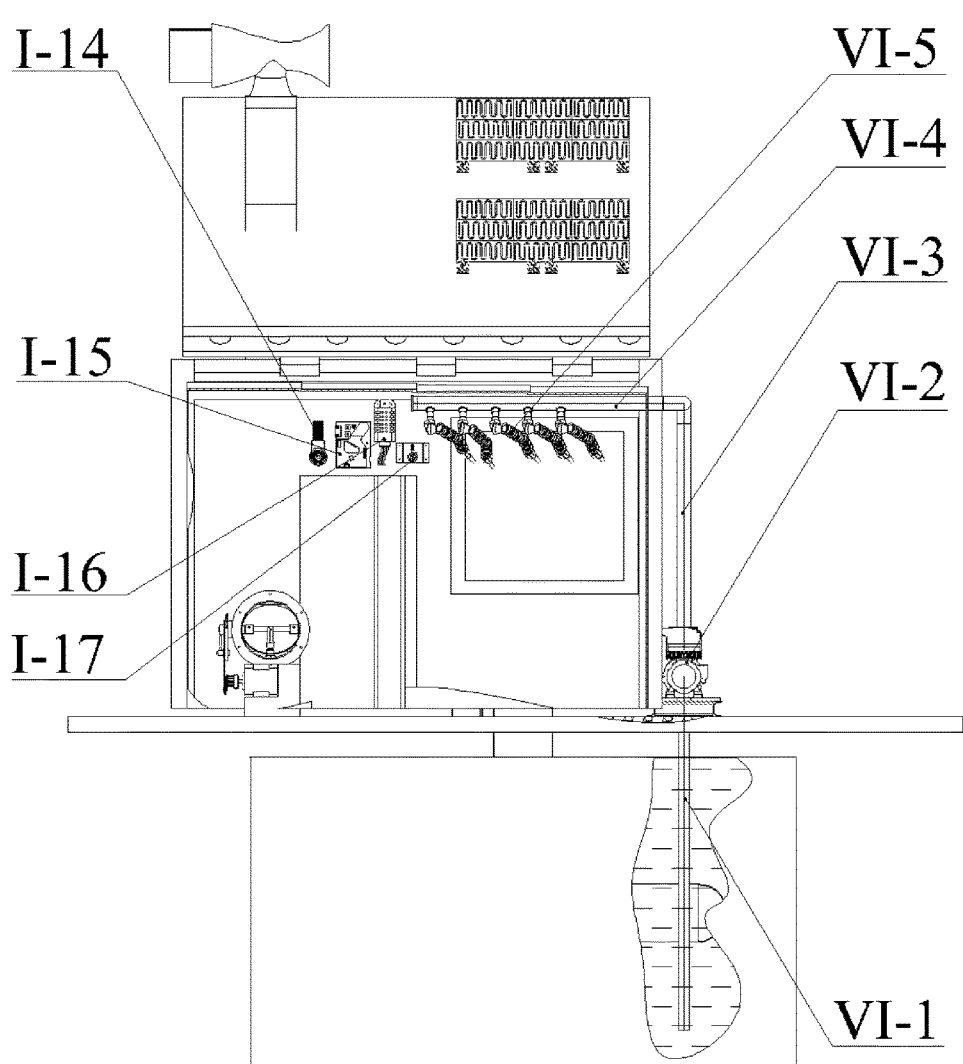
FIG. 13 is a sectional view of an overall structure of a spraying system in embodiments of the present invention.

As shown in FIGS. 10 and 13, the spraying system VI includes a spraying head VI-5, a water delivery pipe, a water pumping tube VI-1, a water pump VI-2, wherein the water pump VI-2 is provided on the ground, a bottom of the pump is connected to the water pumping tube VI-1, and a top of the water pump VI-2 is connected to the water delivery pipe. In the present embodiment, the water delivery pipe includes a vertical section VI-3 of the water delivery pipe and a horizontal section VI-4 of the water delivery pipe which are connected in a whole, wherein the horizontal section VI-4 of the water delivery pipe is located on an upper side of the window III-8, and the horizontal section VI-4 of the water delivery pipe is mounted with a plurality of spraying heads VI-5 at intervals, and the water is sprayed towards the window III-8 through the spraying heads VI-5, which can play the purpose of cleaning the window and assisting in cooling.

In the present embodiment, the house III can be provided with different wall panels according to different seasons through slideways. In winter, the transparent glass wall panel III-6 and the heat collection wall plate III-10 are arrange on the outer side through the slideways to form an outer layer of the walls; in summer, removing and replacing the transparent glass wall panel III-6 and heat collection wall plate III-10 with a thermal insulation wall plate, such as wood plate, which is beneficial to reduce indoor and outdoor heat exchange. A sunny side of the heat collection wall panel III-10 is coated with a black heat absorbing coating to improve the absorption of solar energy. A thermal storage wall panel III-11 is made of PCM for the storage and utilization of the heat by utilizing the phase-change heat generated during the phase-change process of the substance.

An inner layer of the walls includes at least one layer of thermal insulation wall panel III-12, wherein the thermal insulation wall panel III-12 adopts graphene polystyrene board, which can not only preserve thermal insulation, but also prevent fire. The house adopting the walls mentioned-above has small fluctuation of temperature difference between day and night in winter, and the indoor thermal comfort is improved. Part of the heat in the solar chimney is absorbed by the heat storage wall, and the other part of the heat directly enters the room.

The wall on the one side of the house III where the sunroom IV being mounted is a concrete wall III-14, an anti-dislodging groove III-13 is provided on an outer side of the concrete wall III-14 to connect the house III with the sunroom IV. A chimney passage III-7 is provided closed to the wall on the one side of the house III and is connected to the solar chimney system I.

Figure 2:
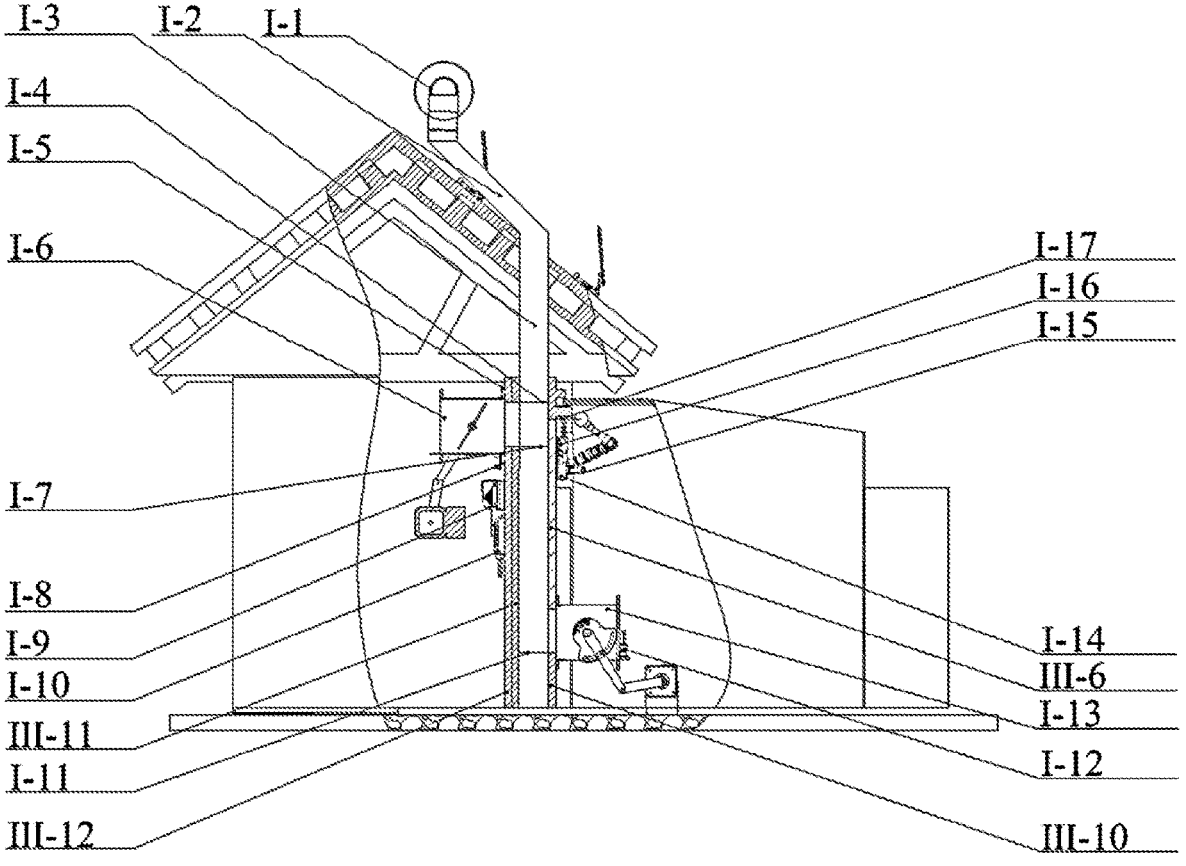
FIG. 2 is a sectional view of an overall structure of a solar chimney system in embodiments of the present invention.

As shown in FIG. 2, the solar chimney system I includes a first Venturi tube I-1 and a solar chimney, wherein the first Venturi tube I-1 is mounted on the top of the house III, and is connected to the solar chimney. The solar chimney includes a chimney inclined section I-2 located at the top of the house III and a chimney vertical section I-3 extending into the house III, wherein the chimney vertical section I-3 runs through the roof and extends to the bottom of the house III. An incline angle of the chimney inclined section I-2 is adapted to the angle of the roof, for example, 45°.

The chimney vertical section I-3 is made of transparent glass, and the transparent glass wall panel III-6 on the outside of the chimney vertical section I-3 causes thermal pressure inside the chimney when irradiated by the sun, which makes the hot air rise and improves the extraction of the chimney. The principle of solar chimney technology is to use solar radiation to increase the temperature difference between the inside and outside of the chimney, which in turn increases buoyancy and thermal pressure and promotes indoor air flow.

A number of wind valves are mounted in the chimney vertical section I-3 to control the air flow. In the present embodiment, two wind valves are mounted in the chimney vertical section I-3, corresponding to the indoor and sunroom IV. The first wind valve I-6 is mounted near the top of the chimney vertical section I-3 and is located inside the house III; the second wind valve I-13 is mounted near the bottom of the chimney vertical section I-3 and is located inside the sunroom IV.

A plurality of intelligent valves is further mounted in the chimney vertical section I-3, which can change the degree of opening and closing thereof according to the temperature change in different seasons. In the present embodiment, a first intelligent valve I-4, a second intelligent valve I-7 and a third intelligent valve I-11 are provided at intervals along the length of the chimney vertical section I-3, wherein the first intelligent valve I-4 and the second intelligent valve I-7 correspond to the first wind valve I-6, and the third intelligent valve I-11 corresponds to the second wind valve I-13.

The chimney inclined section I-2 is also made of transparent glass for generating heat pressure inside the chimney inclined section I-2 by sun irradiation; the chimney inclined section I-2 can achieve better suction effect compared with setting a vertical chimney on the roof, and by combining the solar chimney with the chimney inclined section I-2 and the first Venturi tube I-1, it is more conducive to increasing the suction force of the chimney.

Figure 5:
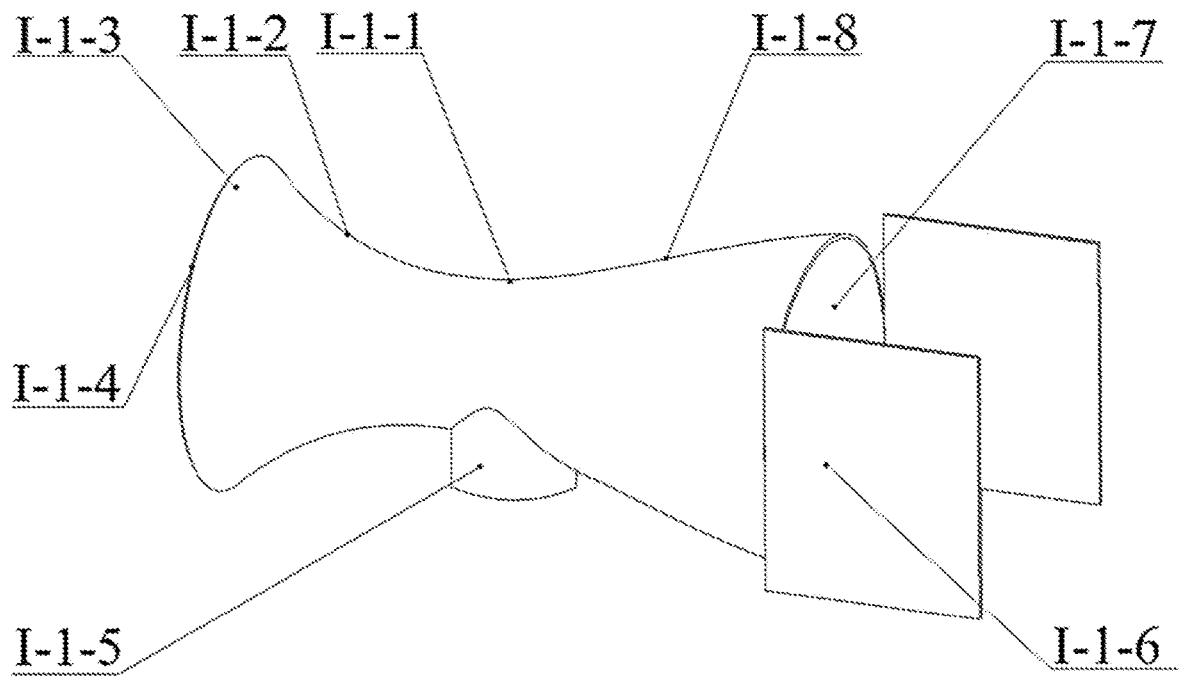
FIG. 5 is a structural view of a Venturi tube device in embodiments of the present invention.

As shown in FIG. 5, the first Venturi tube I-1 includes an inlet section I-1-3, a contraction section I-1-2, a throat I-1-1 and a diffusion section I-1-8 connected as one, one end of the inlet section I-1-3 is an air inlet I-1-4, one end of the diffusion section I-1-8 is an air outlet I-1-7, the throat I-1-1 is a short straight tube section with a diameter of about $\frac{1}{3}$-$\frac{1}{4}$D and a length equal to the diameter of the tube; the contraction section I-1-2 is shaped as a conical tube with a cone angle of about 21°±2°; the inlet section I-1-3 is a short cylindrical section with a diameter of D; the diffusion section I-1-8 is a conical tube with a cone angle of 8°-15°, and the air enters the first Venturi tube I-1 through the air inlet I-1-4. The first Venturi tube I-1 is connected to the solar chimney through the hub bearing I-1-5 to realize the free rotation of the first Venturi tube I-1.

Two induced wind plates I-1-6 are mounted symmetrically on both sides of the air outlet I-1-7. In the present embodiment, the induced wind plates I-1-6 are a flat plate, and the two induced wind plates I-1-6 are parallel to each other and can tend to be parallel to the wind direction, so that the air inlet I-1-4 is always facing the wind direction to increase the suction effect of the solar chimney.

As shown in FIGS. 2 and 10, an inner wall of the wall is also mounted with a carbon monoxide sensor I-8, an inverter I-9, and an indoor temperature and humidity sensor I-10; and a position sensor I-14, an air quality detection device I-15, an outdoor temperature and humidity sensor I-16 and alarm device I-17 are mounted on the position of the wall corresponding to the outer wall of sunroom IV, and an UV disinfection light I-12 is mounted on one side of the second wind valve I-13.

Figure 6:
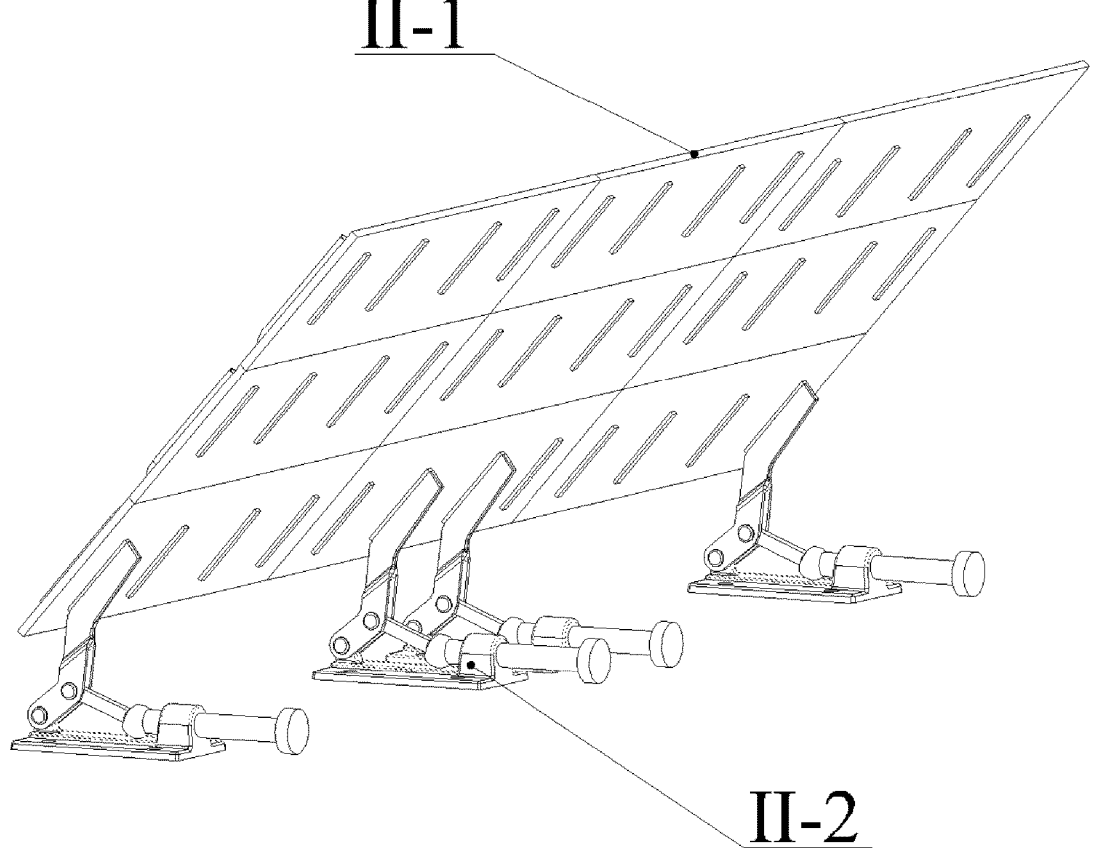
FIG. 6 is a structural schematic view of a solar power supply device in embodiments of the present invention.

A plurality of solar power supply systems II are mounted on the top of the house III, as shown in FIG. 6. Each the solar power supply system II includes a solar photovoltaic panel II-1 and an angle adjustment device II-2, wherein the angle adjustment device II-2 is mounted on the back side of the solar photovoltaic panel II-1 for adjusting the incline angle of the solar photovoltaic panel II-1. The solar photovoltaic panel II-1 generates electrical energy, and the solar battery stores the electrical energy generated by the solar photovoltaic panel for powering the new farmhouse when there is no sunlight; the DC power generated by the solar energy is converted into AC power through the inverter I-9.

Figure 7:
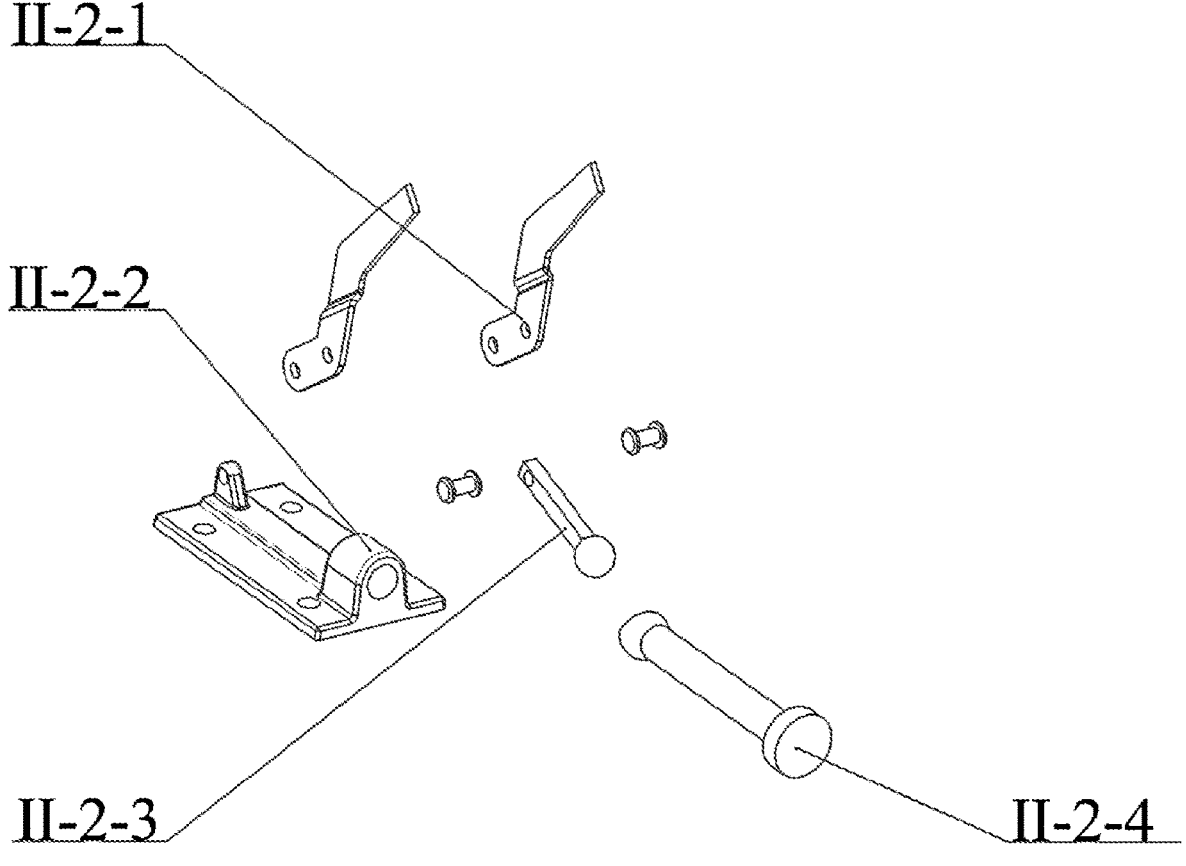
FIG. 7 is an exploded view of an angle adjustment device for a solar photovoltaic cell panel in embodiments of the present invention.
Figure 8:
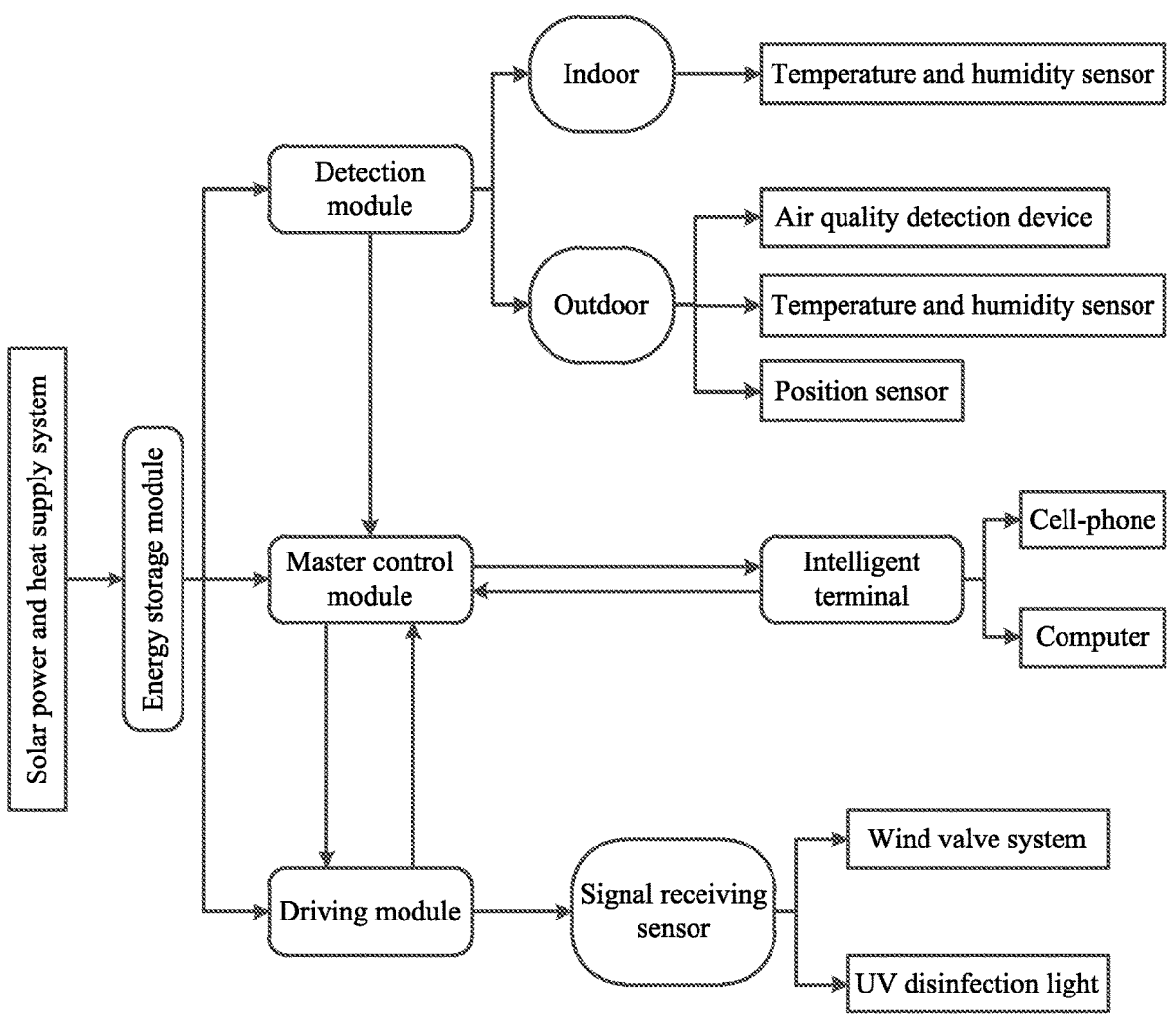
FIG. 8 is a block diagram of control principle of an intelligent wind valve in embodiments of the present invention.

In the present embodiment, a plurality of the angle adjustment devices II-2 are provided at intervals on the back side of the solar photovoltaic panel II-1, and the angle adjustment device II-2, as shown in FIG. 7, includes a base II-2-2, an adjustable bracket II-2-1, spherical connection sub II-2-3, etc. Wherein, a first end of the adjustable bracket II-2-1 is fixed to the back side of solar PV panel II-1 near the bottom position, and a second end of the adjustable bracket II-2-1 is hinged to the base II-2-2; the adjustable bracket II-2-1 is connected to the spherical connection sub II-2-3 at a certain position from the hinge, and the other end of the spherical connection sub II-2-3 is connected to a pushing part II-2-4; the base II-2-2 is provided with a support for guiding the pushing part II-2-4. The pushing part II-2-4 can be a pin or an electric actuator.

The angle adjustment device II-2 may adjust the angle of the solar photovoltaic panel II-1 according to the different azimuth angles of the sun at different latitudes and longitudes in different seasons, and the use of spherical connection sub II-2-3 can effectively avoid multiple angle adjustment devices II-2 interfering with each other and not making the solar photovoltaic panel II-1 reach the desired angle.

Figure 11:
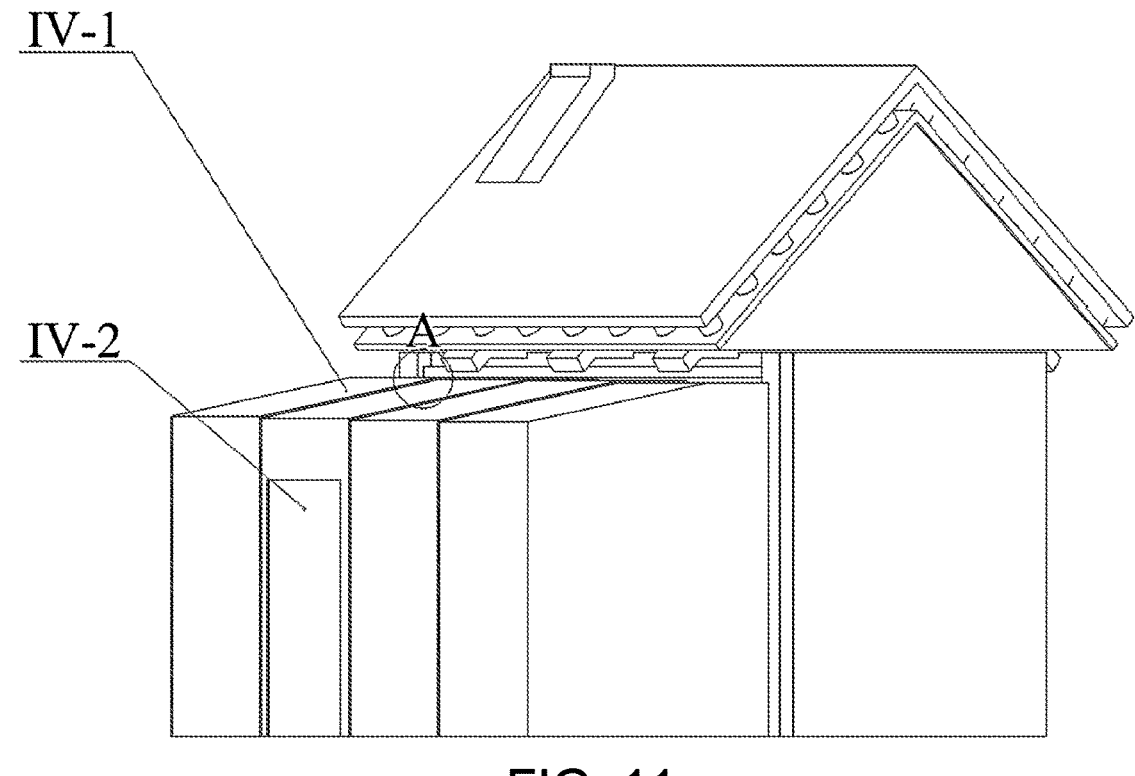
FIG. 11 is a structural schematic view of a sunroom in embodiments of the present invention.
Figure 12:
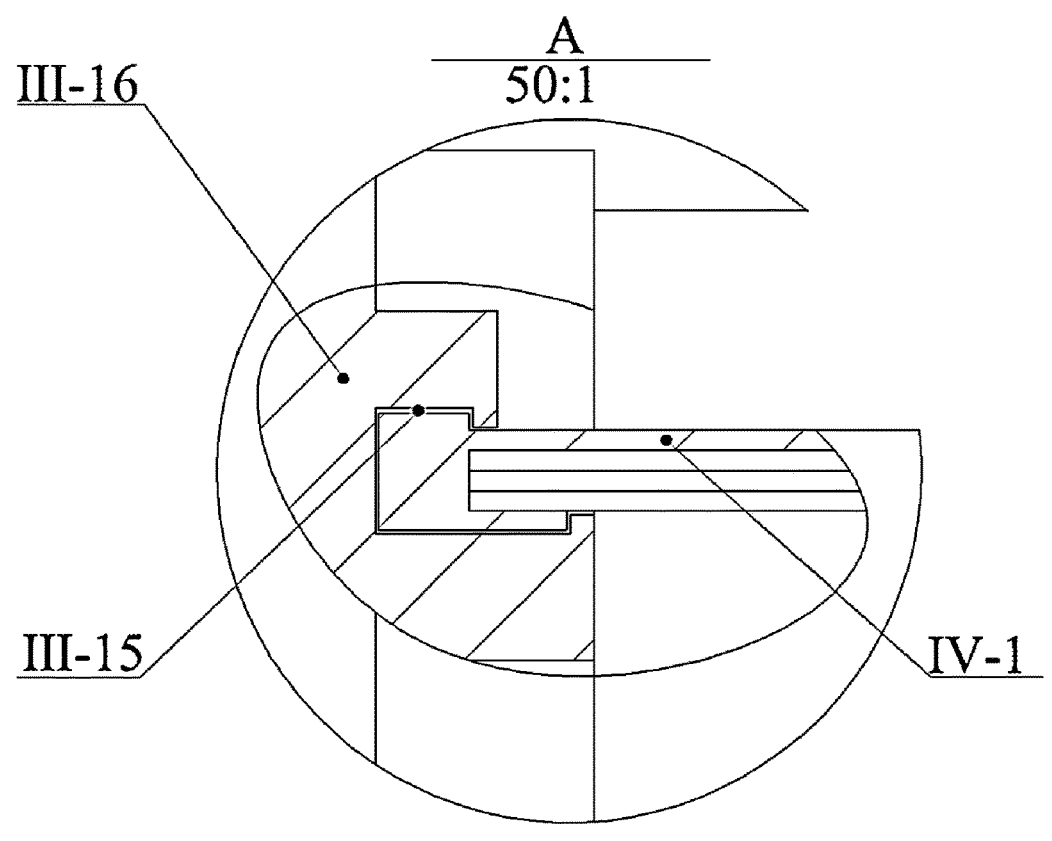
FIG. 12 is a partial enlarged sectional view of a structure of an anti-dislodging groove at a connection between the house and the sunroom in embodiments of the present invention.

As shown in FIGS. 11 and 12, the sunroom IV includes a sunroom skeleton, and the sunroom skeleton is mounted with a plurality of sunroom walls IV-1 in turn, and the sunroom walls IV-1 are made of transparent glass; one of the sunroom walls IV-1 is mounted with a sunroom door IV-2, and the sunroom door IV-2 is also made of transparent glass. The sunroom skeleton is made of high-strength aluminum alloy, which is lighter than the steel structure.

In the present embodiment, the plurality of sunroom walls IV-1 are sequentially arranged along the length direction of the concrete wall III-14, and the heights thereof are sequentially decreased, so as to realize folding. The concrete wall III-14 is provided with an anti-dislodging groove III-13, each the sunroom wall IV-1 is in sliding fit with the anti-dislodging groove III-13, and the bottom of the sunroom walls IV-1 are provided with a slide rail, so that the sunroom is convenient to mount and dismantle. A motor is mounted in the slide rail, which makes the sunroom IV more convenient to fold through an intelligent remote control of the motor.

Figure 14:
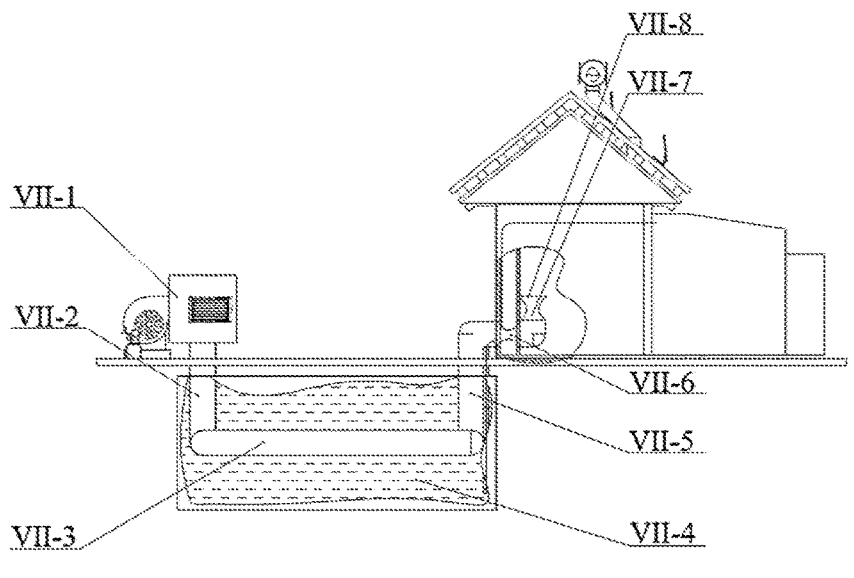
FIG. 14 is a sectional view of an overall structure of a tunnel wind system in embodiments of the present invention.

As shown in FIG. 14, the tunnel wind system VII includes a water cellar VII-4 provided below the ground V. The water cellar VII-4 is equipped with a duct assembly, and a first end of the duct assembly is connected to the forced draft system VII-1, and a second end of the duct assembly is connected to the room through a Venturi tube; wherein, the forced draft system VII-1 and the Venturi tube are located above the ground V.

In the traditional tunnel wind system, the heat exchange part of the buried duct basically adopts the soil-air heat exchanger as an important heat exchange component of the tunnel wind system. However, the heat exchange capacity thereof is not strong and the air continuously transfers its heat to the underground tunnel wall during the cooling process of the tunnel wind system. With the increase of the time of tunnel ventilation, the heat is gradually transferred to the depth of the soil, which leads to the increase of the temperature of the soil and the deterioration of the cooling effect.

Figure 16:
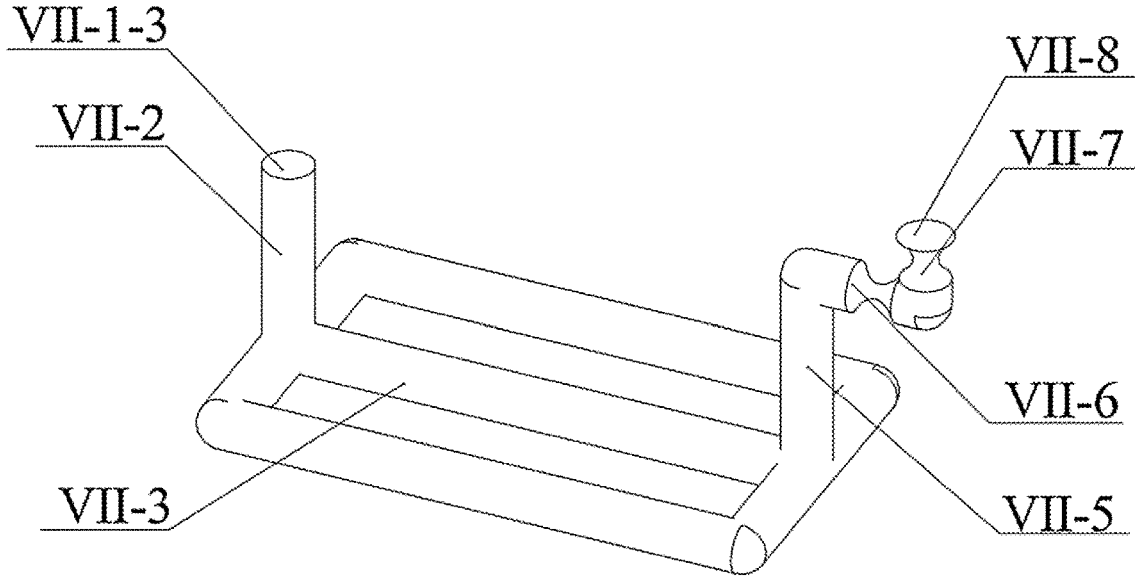
FIG. 16 is a structural view of ducts of the tunnel wind system in embodiments of the present invention.

In the present embodiment, the heat exchange duct VII-3 is placed in the water cellar VII-4, so that the thermal conductivity of the heat exchange duct VII-3 is improved, and the heat exchange effect of the tunnel wind system is improved. As shown in FIG. 16, the duct assembly comprises a forced draft duct VII-2, a heat exchange duct VII-3 and an air outlet duct VII-5 which are sequentially communicated, wherein the forced draft duct VII-2 is connected to the forced draft system VII-1, and the air outlet duct VII-5 is connected to the Venturi tube.

As shown in FIGS. 14 and 16, the end of air outlet duct VII-5 has a bending section, a second Venturi tube VII-6 is connected to the bending section and is communicated with a third Venturi tube VII-7 through a transition duct section, and the axes of the two Venturi tube are perpendicular to each other; an air outlet VII-8 is provided at the end of the third Venturi tube VII-7. The cold air after the heat exchange flows into the air outlet tube VII-5 and enters the room from the air outlet VII-8 through the second Venturi tube VII-6 and the third Venturi tube VII-7, the suction force to the air outlet duct VII-5 is increased by using the second Venturi tube VII-6 and the third Venturi tube VII-7, which is conducive to guiding the cold air to enter the room from the air outlet VII-8.

In the present embodiment, the forced draft duct VII-2 and the air outlet duct VII-5 are vertical tubes, the heat exchange duct VII-3 is provided with a plurality, and the plurality of the heat exchange ducts VII-3 form a parallel structure. That is, in the present embodiment, the heat exchange ducts VII-3 adopt a multi-duct, parallel, and open system, and the open system means that the inlet air of the tunnel adopts fresh outdoor air, and the indoor thermal environment is directly affected by outdoor weather. For high humidity areas, the humidity of the wind coming out of the tunnel is relatively high, and dehumidification devices need to be configured.

When the temperature of the water in the water cellar VII-4 rises to a certain value through heat exchange, a signal is transmitted to the master control module through a temperature sensor in the water cellar VII-4, the master control module transmits the signal to a forced draft fan VII-1-2 through parameter processing, and the forced draft fan VII-1-2 stops working. With the increase of the time of the heat exchange between the outside air sent into the underground heat exchange duct VII-3 and the water in the underground water cellar VII-4, and when the water temperature in the water cellar VII-4 reaches a certain temperature, the heat exchange capacity of the water cellar VII-4 decreases, and the problem of insufficient heat exchange capacity can be solved by replacing the water in the water cellar VII-4; furthermore, two or more water cellars and underground heat exchange ducts can also be arranged according to the actual situation to alternately supply cold to the room, the problem that the heat exchange capacity is insufficient due to long-time heat exchange of one tunnel wind system can be effectively avoided, and the self-adaptive intermittent cooling is realized.

Figure 15:
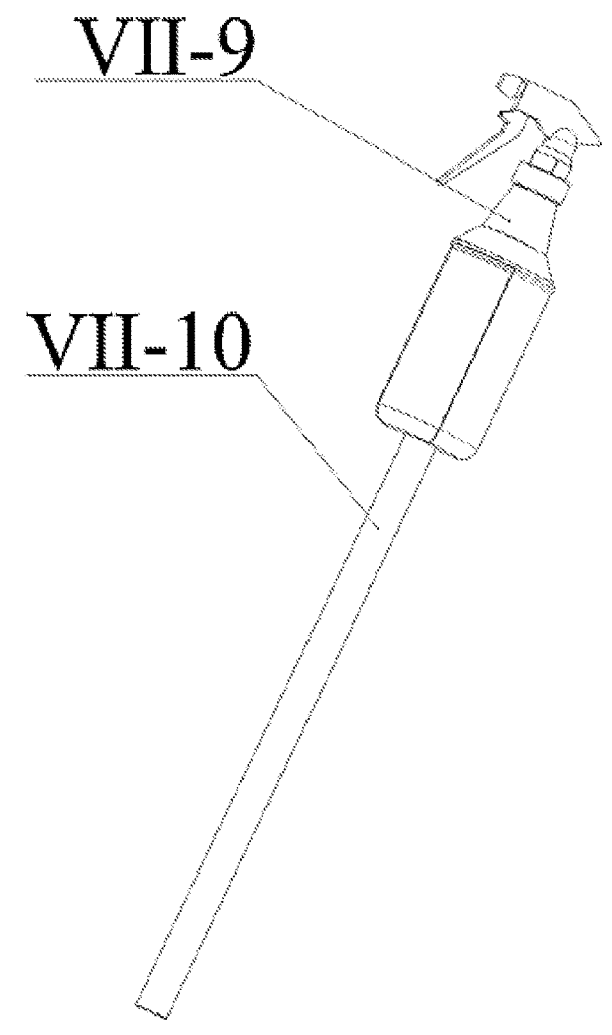
FIG. 15 is a structural view of a tunnel duct condensate water pumping device in embodiments of the present invention.

During long-term operation of the tunnel wind, condensed water will be generated due to heat exchange of outside air in heat exchange duct VII-3. If the condensed water is not removed in time, it will lead to air quality decline, resulting in mildew and microorganisms harmful to human health. Therefore, the heat exchange duct VII-3 is arranged to be slightly inclined downward towards one end of the house III, so that the condensed water is accumulated at the joint of the heat exchange duct VII-3 and the air outlet duct VII-5; then, a water sucker VII-9 as shown in FIG. 15 is used to periodically pump the condensed water in the heat exchange tube VII-3, the water sucker VII-9 is connected to a flexible water pumping tube VII-10, and the flexible water pumping tube VII-10 is sent from the air outlet VII-8 to the bottom of the air outlet duct VII-5 through the third Venturi tube VII-7 and the second Venturi tube VII-6 to pump water.

Figure 17:
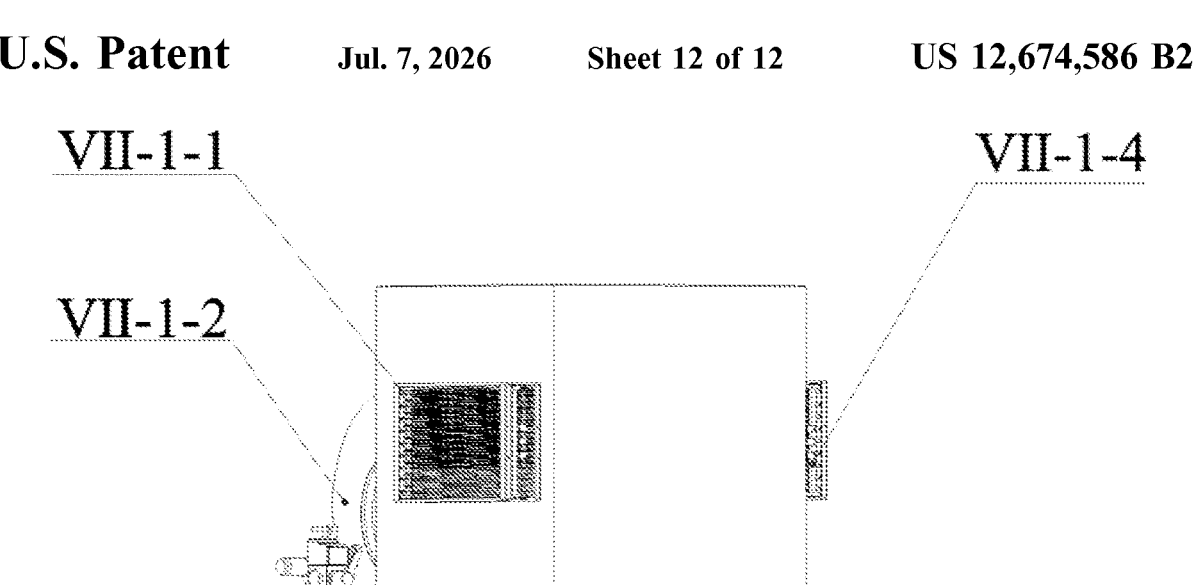
FIG. 17 is a structural view of a forced draft device in embodiments of the present invention.

As shown in FIG. 17, the forced draft system VII-1 includes a housing, the forced draft fan VII-1-2, and a plurality of air purification devices, wherein the forced draft fan VII-1-2 is mounted on one side of the housing, and the plurality of air purification devices are mounted in the housing; in the present embodiment, the air purification devices are provided with two, i.e. a first air purification device VII-1-1 and a second air purification device VII-1-4 are provided symmetrically relative to the housing. The bottom of the housing is provided with the forced draft port VII-1-3 being connected to forced draft duct VII-2.

Figure 18:
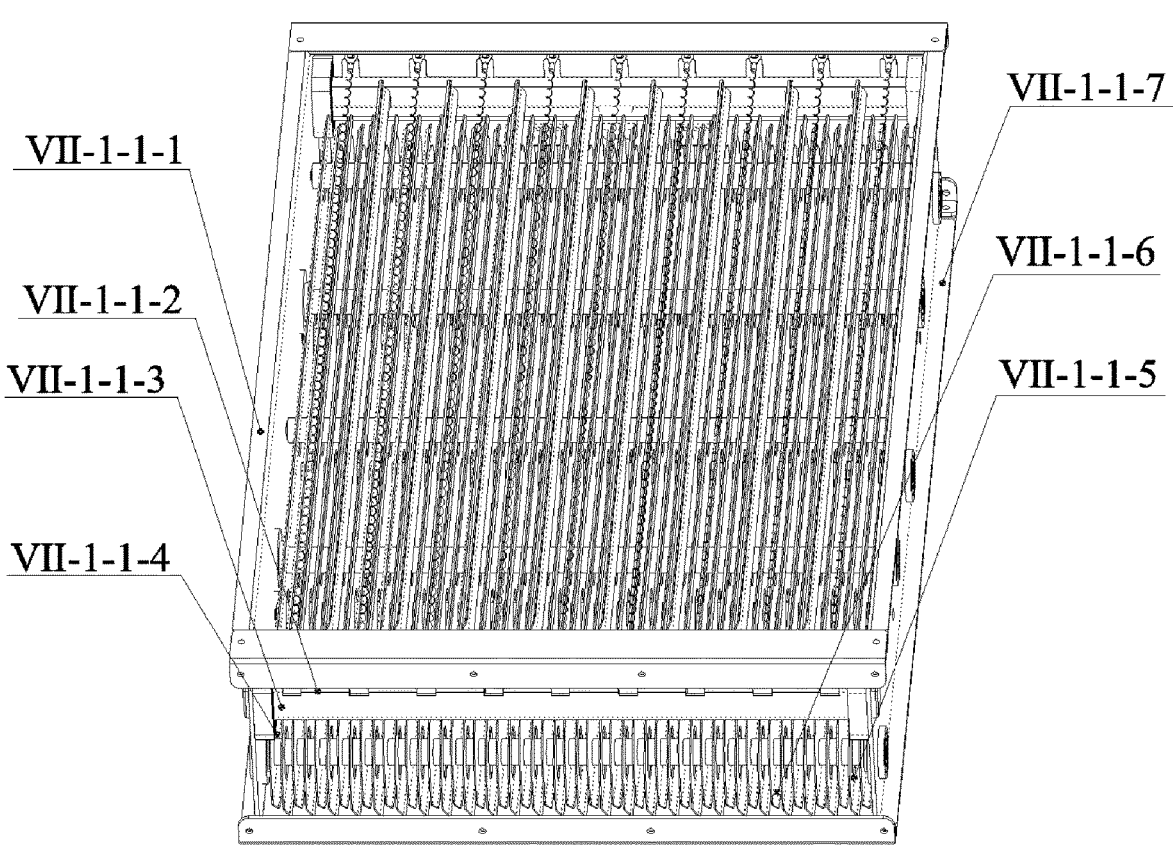
FIG. 18 is a structural view of an air purification device in embodiments of the present invention.

The structure of the first air purification device VII-1-1 is same as that of the second air purification device VII-1-4, as shown in FIG. 18, including a first frame VII-1-1-1 and a second frame VII-1-1-7 arranged at intervals from top to bottom, and a primary filter VII-1-1-2, an activated carbon layer VII-1-1-3, a nano-ion layer VII-1-1-4, an HEPA filter VII-1-1-5 and a cold catalyst layer VII-1-1-6 are provided sequentially from top to bottom between the first frame VII-1-1-1 and the second frame VII-1-1-7, wherein the primary filter VII-1-1-2 is used for filtering dust and large particles, the activated carbon layer VII-1-1-3 is used for the adsorption of odors, the nano-ion layer VII-1-1-4 is used for sterilization, the HEPA filter VII-1-1-5 is used for filtering the fine particles of PM 2.5 and like, the cold catalyst layer VII-1-1-6 is used to remove formaldehyde and other harmful gases. The outside air is purified by the first air purification device VII-1-1 and the second air purification device VII-1-4, and then sent to the heat exchange duct VII-3 by the forced draft fan VII-1-2 through the forced draft port VII-1-3 and the forced draft duct VII-2.

Figure 3:
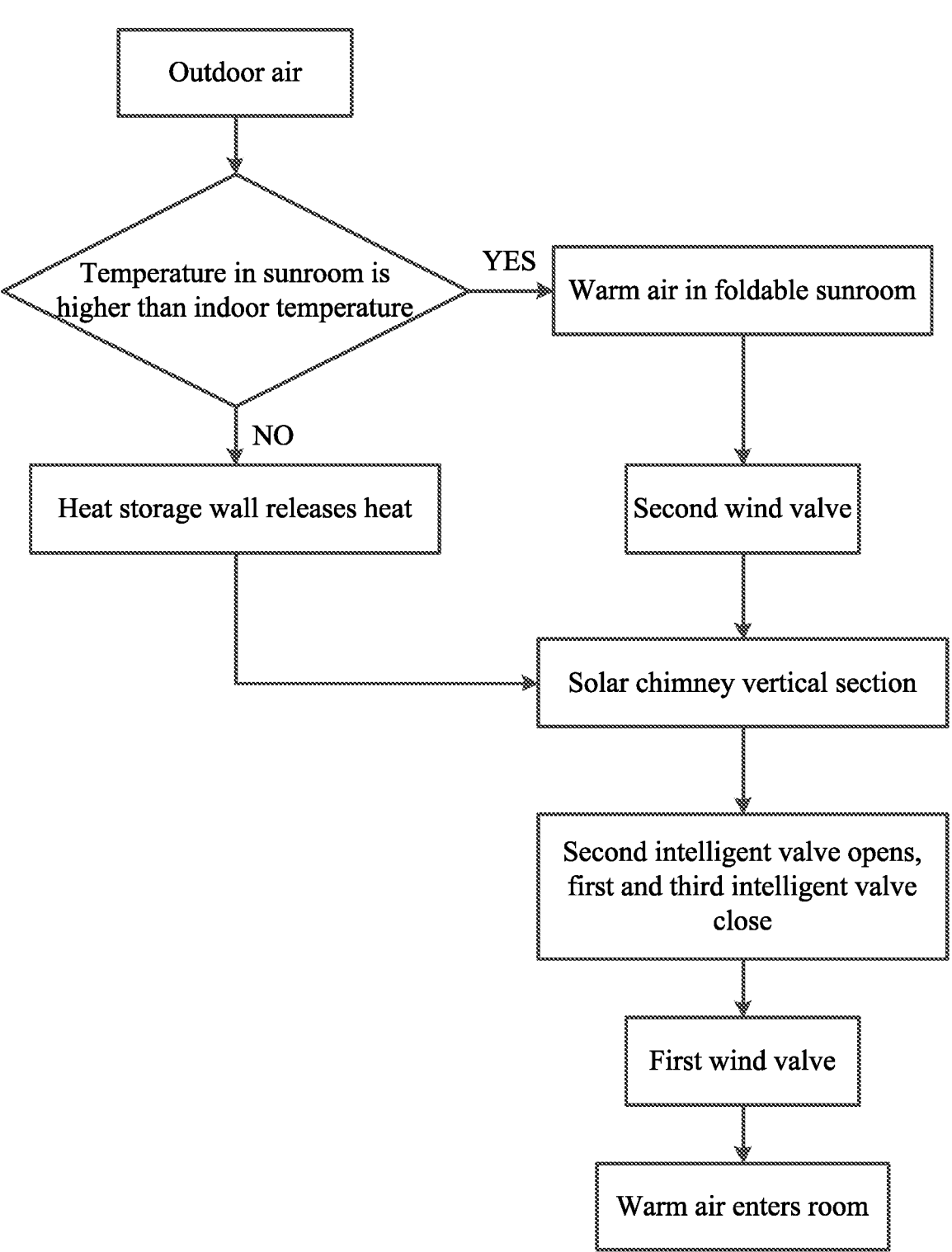
FIG. 3 is a schematic view of air flow for heating in winter in embodiments of the present invention.

The air flow for heating in winter is shown in FIG. 3, the third intelligent valve I-11 is fully closed, the second intelligent valve I-7 is fully opened, and the first intelligent valve I-4 is fully closed. When the sun shines on the transparent glass wall panel III-6 and the heat collection wall panel III-10, the hot pressure will be generated in the chimney vertical section I-3, and the hot air will rise due to heating, so that the purpose of indoor heating can be realized. By the detection module: the indoor and outdoor temperature difference is detected by the indoor temperature and humidity sensor I-10 and the outdoor temperature and humidity sensor I-16; the outdoor air quality, including PM 2.5 and dust concentration, is detected by the air quality detection device I-15, and when the air quality exceeds the preset parameter range, the valve plate in the second wind valve I-13 is automatically closed, wherein the opening and closing of the valve plate in the second wind valve I-13 is not affected by the air quality detection device I-15 within the preset parameter range; the degree of opening and closing of the valve plates in the first wind valve I-6 and the second wind valve I-13 is detected by the position sensor I-14.

The detection module converts the information from sensors into corresponding signals and feeds back the signals to a master control module, the master control module can be controlled by a Single-Chip Microcomputer or a Programmable Logic Controller (PLC), when the master control module receives the signals sent by the detection module, processes the signals according to parameters preset by a user, and then sends instructions to a driving module, the driving module comprises the first wind valve I-6, the second wind valve I-13 and the UV disinfection light I-12, and the opening and closing degree of the first wind valve I-6 and the second wind valve I-13 is controlled according to the signal received by the signal receiving sensor, so as to realize the automatic control of the solar chimney for heating the room.

The master control module can also be connected to an intelligent terminal through a mean of wireless connection, and the intelligent terminal can receive signals from the master control module and convert the signals into parameters, and further can send out corresponding alarm according to preset parameters; meanwhile, the intelligent terminal can send instructions to the master control module to change the opening and closing states of the valve plates in the first wind valve I-6 and the second wind valve I-13 through the master control module, and the intelligent terminal can be controlled through an application on a cell-phone or the application on a computer, so as to realize a remote monitoring and operation to adjust the opening and closing states of the valve plates in the first wind valve I-6 and the second wind valve I-13, and realize the intelligent control of the solar chimney.

When the temperature in the sunroom IV is higher than the indoor temperature, the first wind valve I-6 and the second wind valve I-13 are opened to a corresponding opening and closing degree according to the desired temperature range preset by the user, and the wind is supplied to the room from the sunroom IV through the first wind valve I-6 and the second wind valve I-13, and the UV disinfection light I-12 can physically sterilize the air. When the temperature in the sunroom IV is not higher than the indoor temperature, the heat storage wall plate III-11 releases the stored heat, and the warm air is sent into the room through the chimney vertical section I-3 and the first wind valve I-6.

Figure 4:
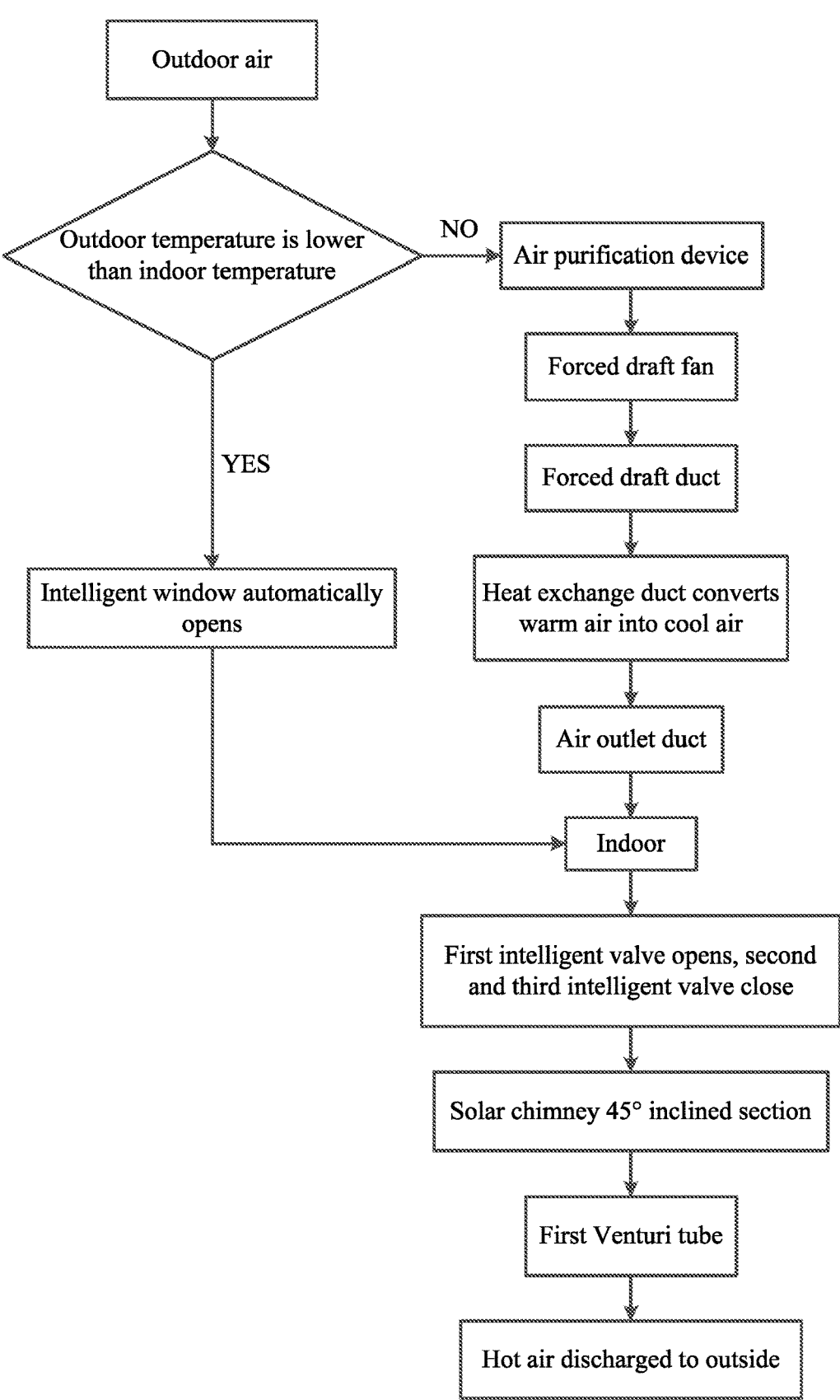
FIG. 4 is a schematic view of air flow for cooling in summer in embodiments of the present invention.

The air flow for cooling in summer is shown in FIG. 4. In summer, when the outdoor temperature is lower than the indoor temperature, window III-8 opens automatically to make outdoor cold air flow into the room; when the outdoor temperature is not lower than the indoor temperature, the outside air passes firstly through the first air purification device VII-1-1 and the second air purification device VII-1-4, and is sent to the forced draft duct VII-2 by the forced draft fan VII-1-2, and then reaches the heat exchange duct VII-3 for the heat exchange and is converted into the cold air; meanwhile, the second Venturi tube VII-6 and the third Venturi tube VII-7 at the outlet of the air outlet duct VII-5 suck the cold air and send the cold air into the room.

Because the high temperature in summer makes the indoor hot air rise to the upper part of the house III, the third intelligent valve I-11 and the second intelligent valve I-7 are all fully closed, the first intelligent valve I-4 is fully opened, and the indoor hot air can be extracted by using the solar chimney and the first Venturi tube I-1 to improve indoor cooling; at the same time, the sunroom IV is folded, the transparent glass wall panel III-6 and the insertable heat collection wall III-10 outside the chimney vertical section I-3 are removed, and replaced with a heat insulation wood wall, so that no heat is generated between the chimney vertical section I-3, the second intelligent valve I-7 and the third intelligent valve I-11 in summer.

By the detection module: the indoor and outdoor temperature difference is detected by the indoor temperature and humidity sensor I-10 and the outdoor temperature and humidity sensor I-16; the opening and closing degree of the valve plate in the first wind valve I-6 is detected by the position sensor I-14. At this time, the second wind valve I-13 and UV disinfection light I-12 and the air quality detection device I-15 are not connected to the power supply, so that the three of them do not work.

The detection module in the working state converts the information from sensors into corresponding signals and feeds back the signals to the master control module, the master control module can be controlled by the Single-Chip Microcomputer or the PLC, when the master control module receives the signals sent by the detection module, processes the signals according to parameters preset by a user, and then sends instructions to the driving module. At this time, the driving module only comprises the first wind valve I-6 and controls the opening and closing degree of the valve plate of first wind valve I-6, so as to realize the automatic control of the solar chimney discharging hot air to the outside. Meanwhile, the master control module is further connected to the intelligent terminal through the mean of wireless connection, and the intelligent terminal can receive signals from the master control module and convert the signals into parameters, and further can send out corresponding alarm according to preset parameters; the intelligent terminal can send instructions to the master control module, simultaneously, to change the opening and closing states of the valve plates in the first wind valve I-6 through the master control module, and the intelligent terminal can be controlled through the application on the cell-phone or the application on the computer, so as to realize a remote monitoring and operation to adjust the opening and closing states of the valve plates in the first wind valve I-6, and realize the intelligent control of the solar chimney.

The energy-saving potential of the tunnel wind system of the present embodiment is mainly reflected in the following three aspects:

(1) Reduction of mean temperature. The outdoor air enters the tunnel and carries on the convection heat transfer with the inner wall surface of the tunnel, the mean temperature thereof reduces in the summer (in winter, it is increased), and it can adjust the indoor air temperature when it is introduced into the ground building. The energy-saving effect of the tunnel wind system is directly reflected in the change of the indoor mean temperature. In summer, the indoor mean temperature of the building with the tunnel wind system is lower than that of the building without the system. The cooling potential Q of the tunnel wind system in summer can be simply calculated by combining a decrease $\Delta T$ of the mean temperature with ventilation q.

$$Q = C_a q \rho_a \Delta T \qquad (1)$$

wherein, Q is the summer cooling potential of the tunnel wind system; $C_a$ is the specific heat capacity of the air; q is the ventilation volume; $\rho_a$ is the density of air; and $\Delta T$ is the decrease in the mean temperature;

The energy saving of tunnel wind system in summer can be obtained by subtracting the power consumption of forced draft fan from the cooling capacity Q.

(2) The lag of high temperature time. After passing through the tunnel air system, a phase of the indoor temperature lags behind that of the outdoor temperature, such as: the peak value of outdoor temperature appears at 12:30, but the peak value of indoor temperature lags behind to 18:00 after the heat storage effect of tunnel and building. For summer, the outdoor temperature generally begins to decrease after 18:00, so the indoor temperature peak is just avoided. In summary, the phase lag characteristic of indoor temperature can be used to avoid the peak temperature in summer, so as to achieve the purpose of energy saving.

(3) Increase of time in comfort zone. Compared with outdoor air temperature, the amplitude of indoor air temperature is attenuated and the fluctuation of indoor air temperature is more stable in both daily and annual cycles. Under the daily cycle condition, the decrease of the indoor mean temperature and the attenuation of the amplitude make the temperature curve fall in the comfort zone most of the time; under the annual cycle condition, although the average value of indoor temperature is unchanged, the annual temperature curve falls within the comfort zone in most of the time due to the attenuation of amplitude, and the air conditioner is not required to be turned on to adjust the temperature during this period of time in the comfort zone, so the effect of saving electricity is achieved.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

What is claimed is:

1. A system for adjusting and controlling temperature of an intelligent new energy farmhouse integrated with tunnel wind and solar energy, comprising:
   a house, comprising walls and a roof, wherein the roof is filled with phase-change energy storage material, and a sunroom is mounted on an outside of one of the walls;
   the house is provided with a detection module, and the detection module is connected to a master control module;
   a solar chimney system, comprising a first Venturi tube provided on a top of the house, the first Venturi tube being connected to a solar chimney, the solar chimney extending longitudinally along an inside of the one of the walls;
   a plurality of solar power supply systems, with the plurality of solar power supply systems being provided on a top of the house for supplying power to the house; and
   a tunnel wind system, comprising a water cellar with a duct assembly being provided inside the water cellar, a first end of the duct assembly is connected to a forced draft system, and a second end of the duct assembly is connected to an interior of the house,
   wherein the duct assembly comprises a forced draft duct, a plurality of heat exchange ducts, and an air outlet duct which are sequentially communicated,
   wherein the plurality of heat exchange ducts is arranged in parallel, and an air outlet of the air outlet duct is connected with a second Venturi tube and a third Venturi tube which is vertical to the second Venturi tube.

2. The system for adjusting and controlling the temperature of the intelligent new energy farmhouse integrated with the tunnel wind and the solar energy according to claim 1, wherein the forced draft system comprises a housing, a forced draft fan mounted on an outside of the housing, and a plurality of air purification devices mounted in the housing; the forced draft fan is connected to the duct assembly through a forced draft port at a bottom of the housing.

3. The system for adjusting and controlling the temperature of the intelligent new energy farmhouse integrated with the tunnel wind and the solar energy according to claim 2, wherein the air purification device comprises a first frame and a second frame arranged at intervals, and a primary filter, an activated carbon layer, a nano-ion layer, a high efficiency particulate air (HEPA) filter, and a cold catalyst layer are provided between the first frame and the second frame in an order from top to bottom.

4. The system for adjusting and controlling the temperature of the intelligent new energy farmhouse integrated with the tunnel wind and the solar energy according to claim 1, wherein an inner layer of the walls is at least one layer of a heat storage wall panel, and an outer layer of the walls is a transparent glass wall panel with a set length, and a heat collection wall panel is provided at a bottom of the transparent glass wall panel;

or, the outer layer is a heat insulating wall panel.

5. The system for adjusting and controlling the temperature of the intelligent new energy farmhouse integrated with the tunnel wind and the solar energy according to claim 4, wherein a passage for the solar chimney to pass through is formed between the outer layer and the inner layer of the one of the walls.

6. The system for adjusting and controlling the temperature of the intelligent new energy farmhouse integrated with the tunnel wind and the solar energy according to claim 5, wherein the solar chimney comprises a chimney inclined section located on the roof and a chimney vertical section extending into the house;

the chimney inclined section is connected to a first end of the first Venturi tube by a hub bearing, and induced wind plates are mounted oppositely on a second end of the first Venturi tube.

7. The system for adjusting and controlling the temperature of the intelligent new energy farmhouse integrated with the tunnel wind and the solar energy according to claim 6, wherein the chimney vertical section is provided with wind valves corresponding to an inner side and an outer side of the house respectively; a plurality of intelligent valves are arranged in the chimney vertical section.

8. The system for adjusting and controlling the temperature of the intelligent new energy farmhouse integrated with the tunnel wind and the solar energy according to claim 7, wherein the wind valve located at the outer side of the house is provided with an UV disinfection light.

9. The system for adjusting and controlling the temperature of the intelligent new energy farmhouse integrated with the tunnel wind and the solar energy according to claim 1, wherein the solar chimney comprises a chimney inclined section located on the roof and a chimney vertical section extending into the house;

the chimney inclined section is connected to a first end of the first Venturi tube by a hub bearing, and induced wind plates are mounted oppositely on a second end of the first Venturi tube.

10. The system for adjusting and controlling the temperature of the intelligent new energy farmhouse integrated with the tunnel wind and the solar energy according to claim 9, wherein the chimney vertical section is provided with wind valves corresponding to an inner side and an outer side of the house respectively; a plurality of intelligent valves are arranged in the chimney vertical section.

11. The system for adjusting and controlling the temperature of the intelligent new energy farmhouse integrated with the tunnel wind and the solar energy according to claim 10, wherein the wind valve located at the outer side of the house is provided with an UV disinfection light.

12. The system for adjusting and controlling the temperature of the intelligent new energy farmhouse integrated with the tunnel wind and the solar energy according to claim 1, wherein the detection module comprises an indoor temperature and humidity sensor, an outdoor temperature and humidity sensor, a position sensor and an air quality detection device, wherein the indoor temperature and humidity sensor is arranged in the house, and the outdoor temperature and humidity sensor, the position sensor and the air quality detection device are arranged outside the house.

13. The system for adjusting and controlling the temperature of the intelligent new energy farmhouse integrated with the tunnel wind and the solar energy according to claim 1, wherein each of the solar power supply systems comprises a solar photovoltaic cell panel being mounted on the roof through an angle adjusting device.

14. The system for adjusting and controlling the temperature of the intelligent new energy farmhouse integrated with the tunnel wind and the solar energy according to claim 13, wherein the solar photovoltaic cell panel is connected to an inverter through a solar storage battery;

the angle adjusting device is arranged with a plurality and at intervals along a back side of the solar photovoltaic cell panel.

15. The system for adjusting and controlling the temperature of the intelligent new energy farmhouse integrated with the tunnel wind and the solar energy according to claim 1, wherein the sunroom comprising a sunroom framework, and a plurality of sunroom walls are sequentially provided on the sunroom framework, and a height of the sunroom walls are sequentially decreased to form a foldable structure;

the sunroom walls are made of transparent glass.

* * * * *